United States Patent
Otani et al.

(10) Patent No.: US 9,014,538 B2
(45) Date of Patent: Apr. 21, 2015

(54) MOVING IMAGE PROCESSING APPARATUS, MOVING IMAGE PLAYBACK APPARATUS, MOVING IMAGE PROCESSING METHOD, MOVING IMAGE PLAYBACK METHOD, AND STORAGE MEDIUM

(75) Inventors: Daisuke Otani, Tokyo (JP); Jun Hosoda, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 304 days.

(21) Appl. No.: 13/224,534

(22) Filed: Sep. 2, 2011

(65) Prior Publication Data

US 2012/0057843 A1 Mar. 8, 2012

(30) Foreign Application Priority Data

Sep. 6, 2010 (JP) .................................. 2010-198802

(51) Int. Cl.
| | |
|---|---|
| H04N 5/77 | (2006.01) |
| H04N 9/80 | (2006.01) |
| G11B 27/00 | (2006.01) |
| G11B 27/10 | (2006.01) |
| H04N 5/907 | (2006.01) |
| H04N 9/804 | (2006.01) |
| H04N 9/82 | (2006.01) |

(52) U.S. Cl.
CPC .............. *H04N 5/772* (2013.01); *G11B 27/005* (2013.01); *G11B 27/105* (2013.01); *H04N 5/907* (2013.01); *H04N 9/8042* (2013.01); *H04N 9/8211* (2013.01)

(58) Field of Classification Search
None
See application file for complete search history.

(56) References Cited

U.S. PATENT DOCUMENTS

| | | | | |
|---|---|---|---|---|
| 6,418,269 | B1 * | 7/2002 | Rijckaert | 386/343 |
| 2003/0165321 | A1 * | 9/2003 | Blair et al. | 386/68 |
| 2003/0165325 | A1 * | 9/2003 | Blair et al. | 386/75 |
| 2005/0254783 | A1 * | 11/2005 | Chen | 386/68 |
| 2005/0276282 | A1 * | 12/2005 | Wells et al. | 370/503 |
| 2006/0117357 | A1 * | 6/2006 | Surline | 725/90 |
| 2006/0127035 | A1 * | 6/2006 | Shen et al. | 386/68 |
| 2007/0269192 | A1 | 11/2007 | Sato | |
| 2007/0296826 | A1 * | 12/2007 | Kimura | 348/222.1 |
| 2010/0002149 | A1 * | 1/2010 | Ehlers et al. | 348/699 |
| 2010/0226624 | A1 * | 9/2010 | Yamori et al. | 386/84 |

FOREIGN PATENT DOCUMENTS

| | | |
|---|---|---|
| JP | 2004-180289 A | 6/2004 |
| JP | 2004-180290 A | 6/2004 |
| JP | 2007-312006 A | 11/2007 |
| JP | 2008-153795 A | 7/2008 |

* cited by examiner

*Primary Examiner* — Hung Dang
*Assistant Examiner* — Sunghyoun Park
(74) *Attorney, Agent, or Firm* — Holtz, Holtz, Goodman & Chick PC

(57) ABSTRACT

A moving image processing apparatus comprises an image capturing unit (2) that acquires data of a moving image by capturing a plurality of continuous image frames, an audio data attaching unit (14) that attaches more than one kind of audio data to the data of the moving image acquired by the image capturing unit, and a playback information attaching unit (14) that attaches playback information to the data of the moving image to which the audio data is attached by the audio data attaching unit. The playback information indicates a playback mode corresponding to each of the more than one kind of audio data. The playback mode includes a first mode of playing back the data of the moving image by skipping some of the frames and a second mode of playing back the moving image without skipping.

10 Claims, 6 Drawing Sheets

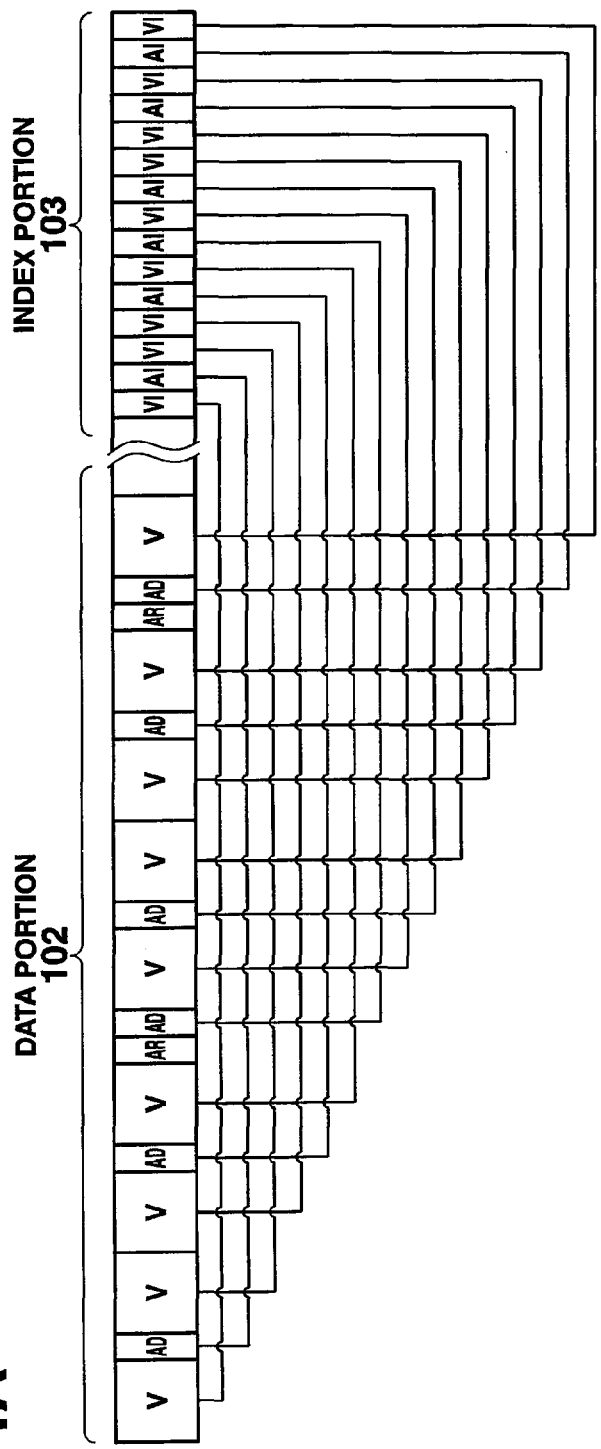
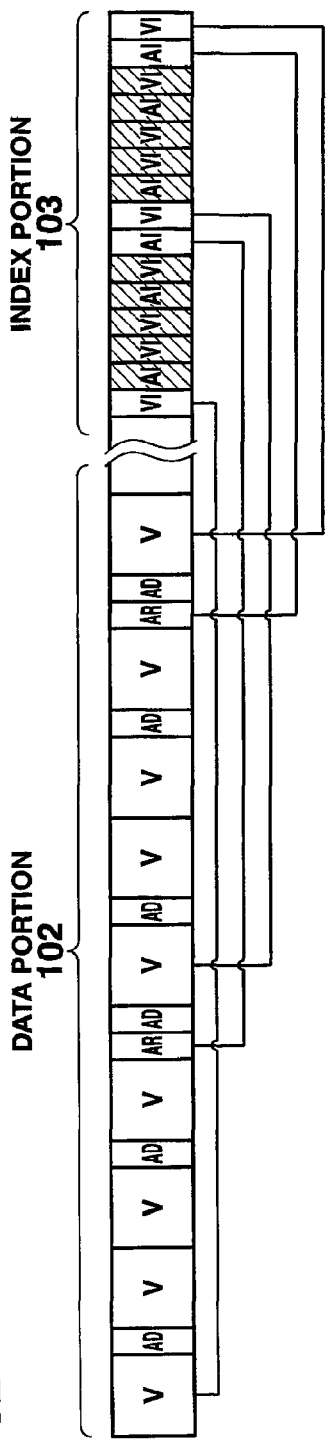
FIG.4A
FIG.4B

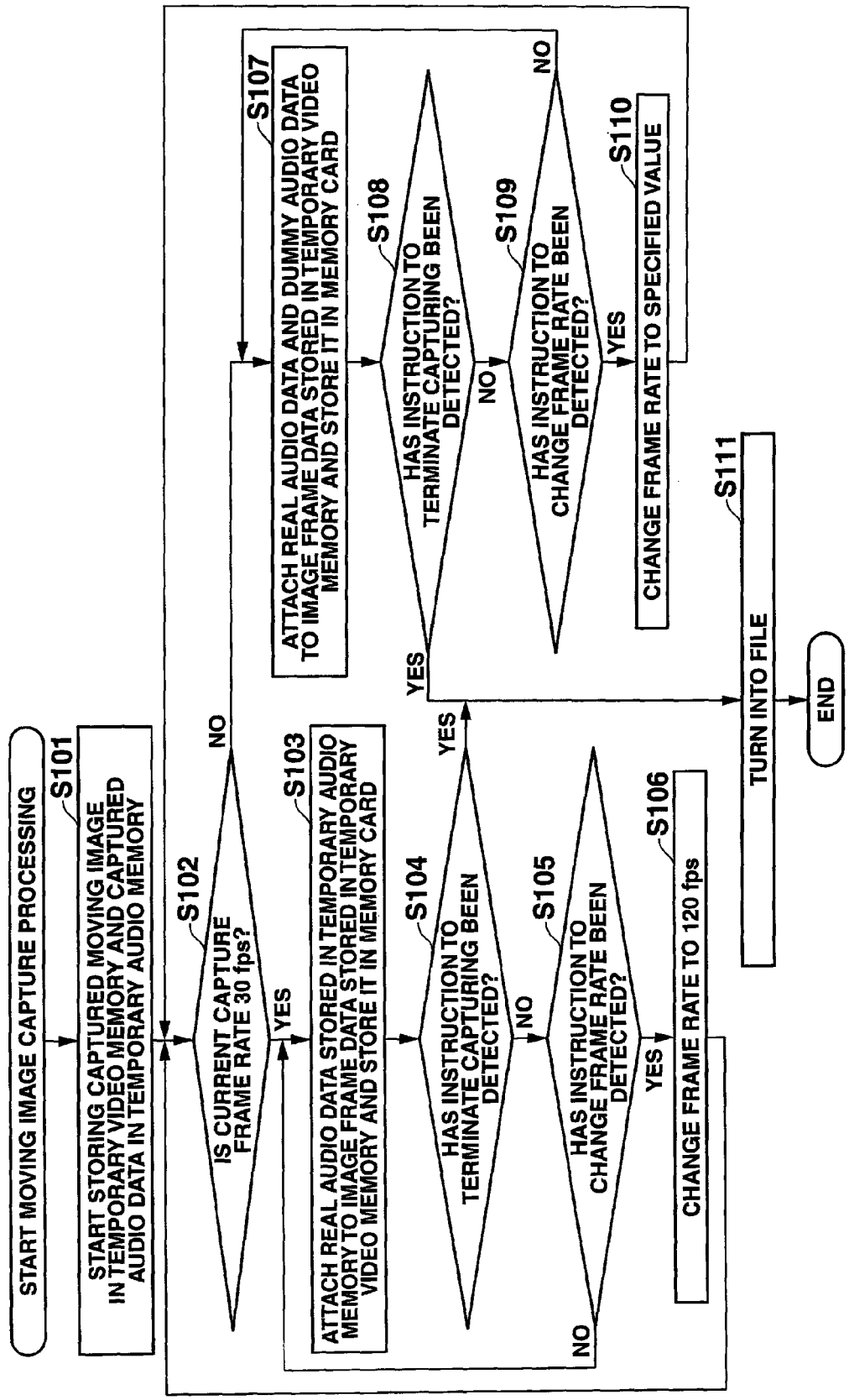

MOVING IMAGE PROCESSING APPARATUS, MOVING IMAGE PLAYBACK APPARATUS, MOVING IMAGE PROCESSING METHOD, MOVING IMAGE PLAYBACK METHOD, AND STORAGE MEDIUM

The application is based on and claims the benefit of priority from Japanese Patent Application No. 2010-198802 filed on Sep. 6, 2010, the content of which is incorporated herein by reference.

BACKGROUND OF THE INVENTION

1. Field of the Invention

The present invention relates to a moving image processing apparatus, a moving image playback apparatus, a moving image processing method, a moving image playback method, and a storage medium.

2. Related Art

As represented by a digital video camera and the like, image capturing apparatuses that can simultaneously record moving images and sounds are common. Among such image capturing apparatuses, there are some that perform multiplexing of encoded and packetized audio data and moving image data into a file with synchronization information being embedded in the packet header of the audio data for the purpose of audio-video synchronization. Also proposed is a technique in which the frame rate can be arbitrarily changed while capturing a moving image and, in accordance with the changed frame rate, a sampling rate of audio data to be recorded is changed, thereby avoiding a sense of discomfort from being felt while listening to the sound (See Japanese Patent Application Publication No. 2004-180289, for example).

However, with the conventional technique described above, since the sampling rate of audio data is changed in accordance with the changed frame rate, when a moving image with sound recorded at a high frame rate, e.g., 60 fps (Frames Per Second), is played back at a normal frame rate, e.g., 30 fps, the sound is also played back at half speed and becomes hardly audible. It will become much less audible, in a case of an image capturing apparatus recently launched in the market that can capture a moving image at a higher frame rate of 120 fps.

Alternatively, there is proposed another technique that records sound only when a moving image is recorded at a normal frame rate, but does not record sound when a moving image is recorded at a high speed. With such a technique, however, a silent moving image is played back when the moving image captured at high speed is played back at the normal frame rate by frame skipping or the like, and it will be tedious to a user.

SUMMARY OF THE INVENTION

It is an object of the present invention to make it possible to play back an appropriate sound well synchronized with a moving image even when the moving image is played back by skipping some frames of the moving image. Summary of the Invention In accordance with a first aspect of the present invention, there is provided a moving image processing apparatus, comprising: an image capturing unit that acquires data of a moving image including a plurality of continuous image frames, by image capturing, an audio data attaching unit that attaches more than one kind of audio data to the data of the moving image acquired by the image capturing unit, and a playback information attaching unit that attaches playback information to the data of the moving image to which the more than one kind of audio data is attached by the audio data attaching unit, the playback information indicating a playback mode corresponding to each of the more than one kind of audio data when the data of the moving image is played back, wherein the playback mode includes a first playback mode of playing back the data of the moving image by skipping some of the image frames of the data of the moving image and a second playback mode of playing back the data of the moving image without skipping any of the image frames of the data of the moving image.

In accordance with a second aspect of the present invention, there is provided a moving image playback apparatus that plays back a moving image file including data of a moving image including a plurality of continuous image frames acquired by image capturing, more than one kind of audio data, and playback information that indicates a playback mode corresponding to each of the more than one kind of audio data, the moving image playback apparatus, comprising:

a determining unit that determines a playback mode;

an audio data specifying unit that specifies audio data corresponding to the playback mode determined by the determining unit based on the playback information; and a moving image playback unit that plays back the data of the moving image along with the audio data specified by the audio data specifying unit in the playback mode determined by the determining unit.

BRIEF DESCRIPTION OF THE DRAWINGS

FIG. 4 is a diagram illustrating relations between image frame data, real audio data, and dummy audio data in a case in which a moving image file captured at a high frame rate by the digital camera shown in FIG. 1 is played back without skipping any frames and in a case in which the moving image file is played back at a normal frame rate by skipping some frames;

FIG. 5 is a flowchart showing flow of moving image capture processing carried out by the digital camera shown in FIG. 1.

DETAILED DESCRIPTION OF THE INVENTION

The following describes an embodiment of the present invention with reference to the drawings.

Figure 1:
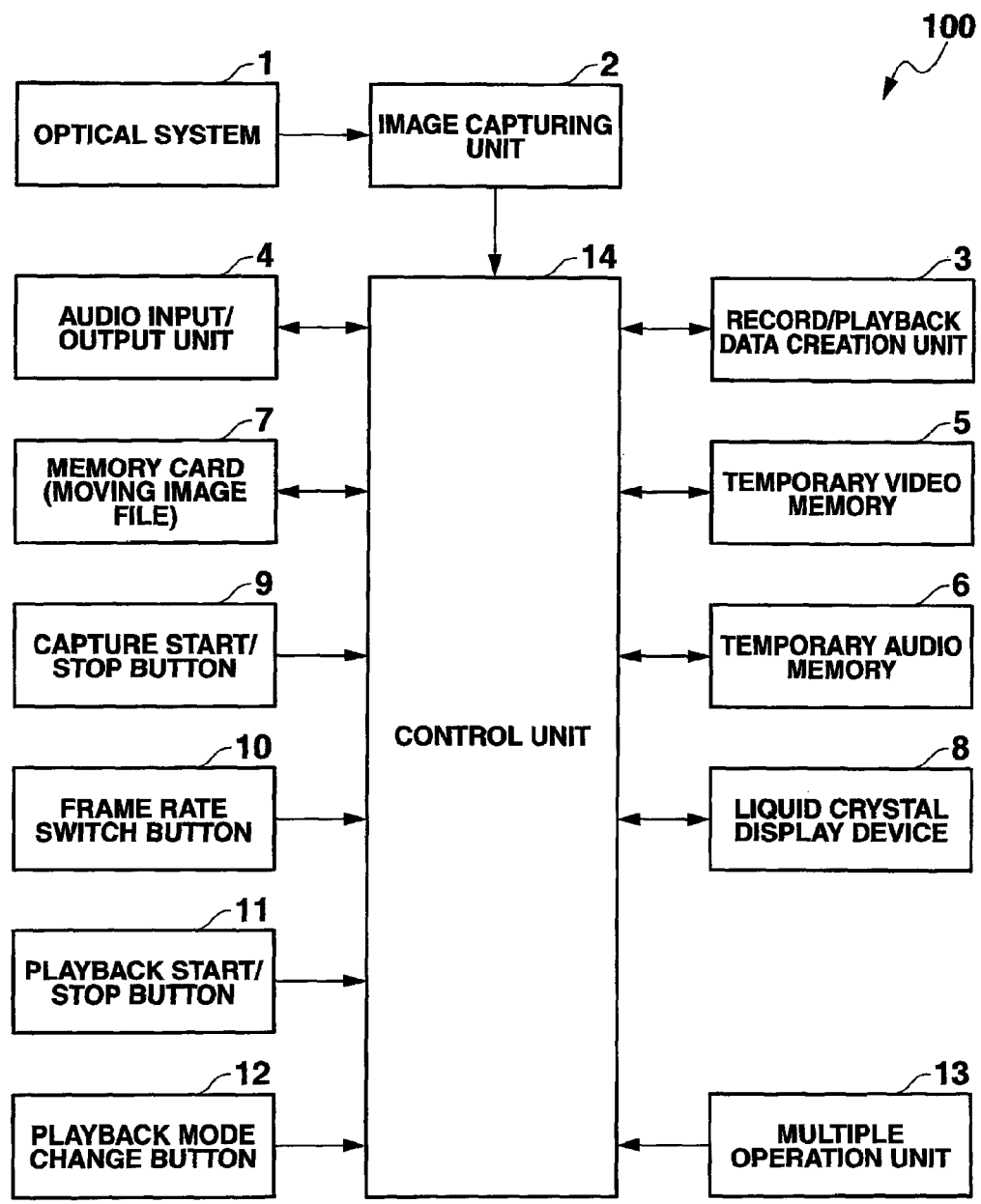
FIG. 1 is a block diagram showing a circuit configuration of a digital camera having a function of a moving image processing apparatus according to one embodiment of the present invention.

FIG. 1 is a diagram showing a circuit configuration of the digital camera 100 that functions as a moving image processing apparatus according to one embodiment of the present invention.

The digital camera 100 of the present embodiment performs capture and playback of a moving image. Each of a plurality of still images constituting the captured moving image is hereinafter referred to as a "frame". That is, a moving image is constituted by a plurality of frames. The digital camera 100 is provided with a capture mode for capturing a moving image and a playback mode for playing back the captured moving image as basic modes of operation. The capture mode for capturing a moving image includes a high speed capture mode as well as a normal capture mode. The high speed capture mode further includes a capture mode such that the frame rate is variable between 30 fps (a normal frame rate) and 120 fps (a high frame rate). The present embodiment aims to avoid playback such that sound becomes hardly audible, by maintaining synchronization between images and sound even if the frame rate is changed between 30 fps and 120 fps while capturing a moving image in such a capture mode.

Furthermore, in the present embodiment, the playback mode for playing back data of a moving image includes a slow motion playback mode as well as a normal playback mode. Here, the playback mode is determined based upon the relation between a frame rate at which a moving image is captured (hereinafter referred to as "a capture frame rate") and a frame rate at which data of the moving image is played back (hereinafter referred to as "a playback frame rate"). This means that the normal playback mode is a playback mode in which data of a moving image is played back at a playback frame rate equal to the capture frame rate or a playback mode in which frames of the data of the moving image are skipped so as to reduce the frame rate thereof equal to a playback frame rate, and the data of the moving image thus skipped is played back at the playback frame rate. The slow motion playback mode is a playback mode in which data of a moving image is played back at a playback frame rate lower than the capture frame rate. Since it is assumed that the playback frame rate of the digital camera 100 of the present embodiment is 30 fps, a moving image captured at a capture frame rate of 30 fps is played back in the normal playback mode if the moving image is played back as is. On the other hand, data of a moving image captured at a capture frame rate of 120 fps is played back as it is in slow motion playback. The normal playback mode and the slow motion playback mode carried out by the digital camera 100 of the present embodiment will be described in detail later.

As shown in FIG. 1, the digital camera 100 is provided with an optical system 1, an image capturing unit 2, a record/playback data creation unit 3, an audio input/output unit 4, a temporary video memory 5, a temporary audio memory 6, a memory card 7, a liquid crystal display device 8, a capture start/stop button 9, a frame rate switch button 10, a playback start/stop button 11, a playback mode change button 12, a multiple operation unit 13, and a control unit 14.

The optical system 1 is constituted by an optical lens to cause the light incident from a subject to form an optical image on an image capturing unit 2, which is described later, and is configured by a focus lens, a zoom lens, or the like.

The image capturing unit 2 consists of an image sensor such as CMOS (Complementary Metal Oxide Semiconductor) or the like and is disposed on an optical axis of the optical system 1. The image sensor receives the captured light condensed by the optical system 1, optoelectronically converts the optical image of the subject formed on an acceptance surface thereof, and outputs it as an analog captured signal. The image capturing unit 2 captures images at a predetermined frame rate while capturing a moving image. As described later, in the capture mode of the present embodiment, images are captured at a frame rate of 30 fps or 120 fps.

Furthermore, the image capturing unit 2 includes a preprocessing unit (not shown) that executes image processing such as A/D conversion to convert the analog captured signal outputted from the image sensor to digital image data, gamma correction, white balance correction, and edge enhancement, and outputs it as digital image data. The image data processed by the preprocessing unit is temporarily stored in the temporary video memory 5 via the record/playback data creation unit 3 and the control unit 14. The optical system 1 and the image capturing unit 2 of the present embodiment functions as an image capturing unit according to the present invention.

The record/playback data creation unit 3 is a circuit that encodes the image data outputted from the image capturing unit 2 and the audio data collected by the audio input/output unit 4, which will be described later. More specifically, for example, the record/playback data creation unit 3 encodes by way of encoding processing using a predictive coding method adopted by the MPEG (Motion Picture Expert Group). The image data (data of a moving image) stored in the temporary video memory 5 and the audio data stored in the temporary audio memory 6, which will be described later, are encoded in order of capture as audio video data at a normal frame rate of 30 fps, for example, and thus encoded data is sequentially stored in the memory card 7.

The audio input/output unit 4 is configured by a microphone that collects ambient sound while capturing a moving image, a speaker that outputs audio data as sound, and the like. The control unit 14 carries out predetermined signal processing on data of the sound collected by the audio input/output unit 4 during moving image capturing and stores the data thus processed in the temporary audio memory 6 as audio data. In the present embodiment, since audio data is continuously stored in the temporary audio memory 6 even in a period in which no audio data of any real sound is attached to data of a moving image, the microphone is constantly turned on during moving image capturing.

The temporary video memory 5 is a video storage unit that sequentially stores data of each frame of the moving image outputted from the image capturing unit 2. The temporary audio memory 6 is an audio storage unit that sequentially stores the audio data of the sound collected by the audio input/output unit 4.

In the present embodiment, the data of each frame of the moving image is stored in the temporary video memory 5, and the audio data of the sound is stored in the temporary audio memory 6. While the frame rate at which the moving image is captured is 30 fps, the audio data of the sound stored in the temporary audio memory 6 is attached to the data of the moving image stored in the temporary video memory 5, and the resultant data is stored in the memory card 7 as a moving image file.

On the other hand, if the frame rate at which a moving image is captured is 120 fps, as well as audio data (hereinafter referred to as "real audio data") of a real sound collected by the audio input/output unit 4, audio data (hereinafter referred to as "dummy audio data") of a dummy sound (pseudo sound) is attached to the data of the moving image stored in the temporary video memory 5, and the resultant data is stored in the memory card 7. As dummy audio data, silent audio data (no sound) may be used. Also, as dummy audio data, data of a predetermined sound, e.g., a sound effect such as a bleep, a message such as "Playing back in slow motion", music, or the like may be employed. Alternatively, audio data such as information on the moving image, a plurality of sound effects, BGM (Back Ground Music), and the like may be prepared in advance, so that any items of the dummy audio data may be selected or combined as appropriate and recorded as the dummy audio data.

The memory card 7 is a storage medium that stores the data of the moving image and the audio data described above. When instructed to terminate capturing, predetermined header information is attached to the data of the moving image and the audio data stored in the memory card 7, and the resultant data is turned into a moving image file.

The liquid crystal display device 8 is provided with a VRAM, a liquid crystal monitor, a driving circuit thereof, and the like, which are not illustrated. The liquid crystal display device 8 displays a through image (live view image) while waiting for capturing or while capturing the image. Also, the liquid crystal display device 8 displays a moving image based on the data stored in the memory card 7, or the like. The frame rate of 30 fps, at which the image capturing unit 2 captures a moving image, is also employed as the playback frame rate at which the liquid crystal display device 8 plays back the moving image.

The capture start/stop button 9 is a part that inputs user instructions to start and stop capturing. The frame rate switch button 10 is a part that inputs a user instruction to change frame rate while capturing a moving image. The playback start/stop button 11 is a part that inputs a user instruction to start and/or stop playback of a moving image or the like.

The playback mode change button 12 is a part that changes the playback mode when playing back a moving image between a normal playback mode and a slow motion playback mode. In the present embodiment, the playback mode change button 12 functions as a playback mode determining unit according to the present invention.

The multiple operation unit 13 is a part that inputs user instructions of various kinds regarding the operation of the digital camera 100. The multiple operation unit 13 may be, for example, an operation unit allowing a user to set/modify various functions and operation contents of the digital camera 100 as well as a mode setting button allowing a user to set the capture mode or the playback mode, a power switch, or a zoom key.

The control unit 14 is configured by a CPU (Central Processing Unit), a ROM (Read Only Memory), a RAM (Random Access Memory), and a peripheral circuit thereof, which are not illustrated, and controls overall operation of the digital camera 100 including capturing, playback, and display of a moving image, and the like. The ROM stores a program to execute controls including moving image capturing, playback and display thereof, and the like, according to the present embodiment, which will be described later. The RAM is used as a temporary storage area when various controls and computing processes are carried out. In the present embodiment, the control unit 14 functions as an audio data attaching unit, a playback information attaching unit, and an audio data specifying unit according to the present invention. The processing content of the control unit 14 as an image capturing unit and an image playback unit will be described later with reference to flowcharts.

In the present embodiment, the record/playback data creation unit 3 executes data compression processing in accordance with, for example, the Motion-JPEG format, turns data of a moving image and audio data into a file of AVI (Audio Video Interleave) format, and stores the file in the memory card 7. This means that an image file including audio data and data of a moving image is created as a moving image file in AVI format, i.e., an AVI file, and stored in the memory card 7.

Figure 2:
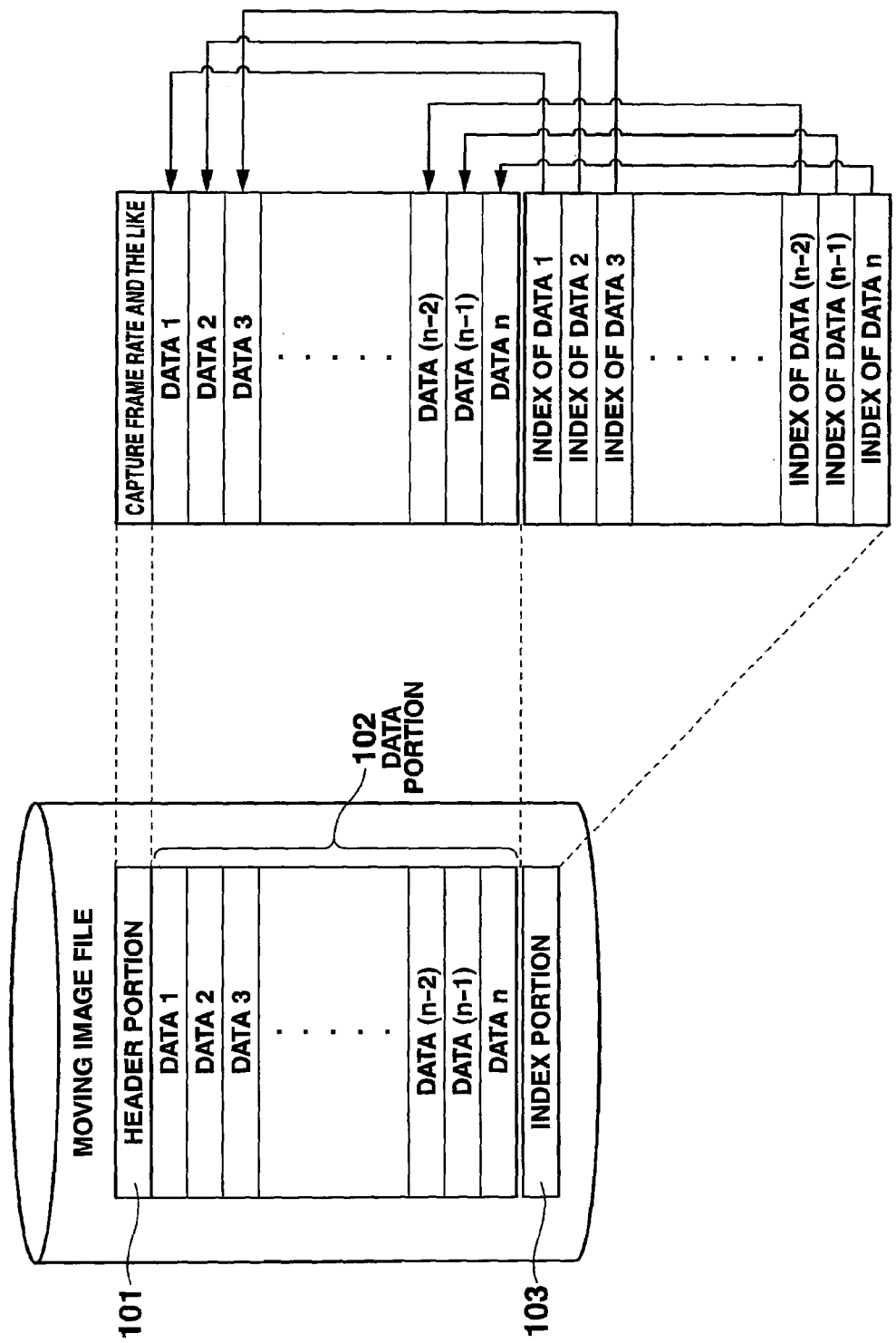
FIG. 2 is a diagram illustrating an outline of a general AVI file generated in the Motion-JPEG format.

FIG. 2 shows an outline of a general AVI file generated in the Motion-JPEG format.

As shown in FIG. 2, the AVI file includes a header portion 101, a data portion 102, and an index portion 103.

The header portion 101 includes basic information such as the capture frame rate of the moving image and the total number of frames constituting the moving image, and playback information, which will be described later. The data portion 102 includes data of the constituent frames of the moving image and audio data. The index portion 103 includes index data that specifies positions of image frame data and audio data stored in the data portion 102 in playback order.

FIG. 3 is a diagram illustrating relations between real audio data, dummy audio data, and image frame data constituting a moving image captured by the digital camera 100, provided with functions as moving image processing apparatus according to the present embodiment.

Figure 3A:
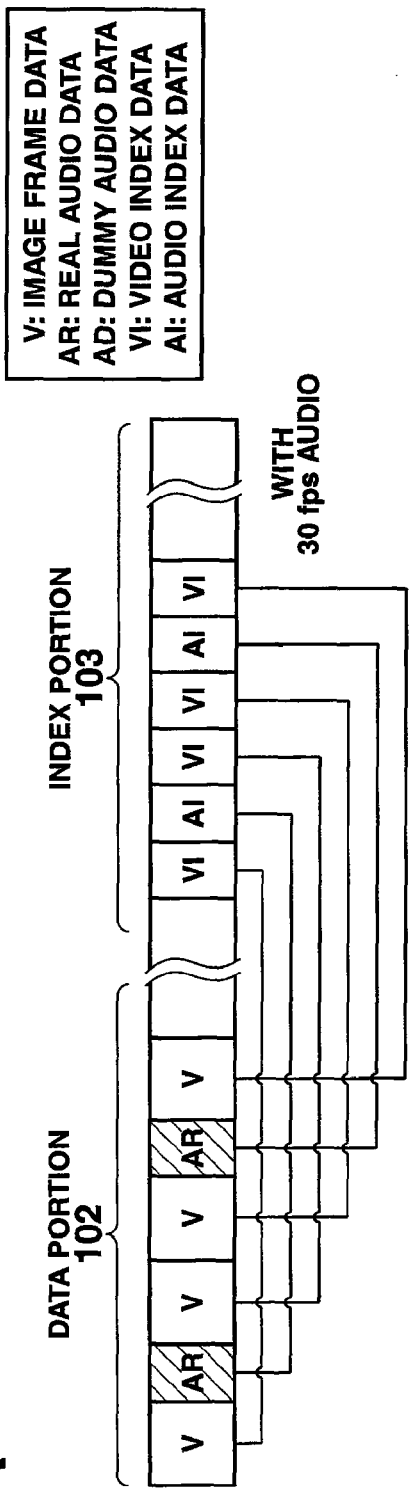
FIG. 3 is a diagram illustrating relations between image frame data, real audio data, and dummy audio data included in a moving image file captured by the digital camera shown in FIG. 1.

FIG. 3A (upper part of FIG. 3) illustrates a relation between audio data and data of a moving image captured at a normal frame rate of 30 fps. The data portion 102 includes real audio data AR and image frame data V constituting the moving image. The index portion 103 includes video index data VI that specifies positions of image frame data V and audio index data AI that specifies positions of the real audio data AR in a playback order.

The control unit 14 determines that the moving image is captured at 30 fps based on the header portion 101 (See FIG. 2). Then the control unit 14 plays back and outputs, via the liquid crystal display device 8 and the audio input/output unit 4, the image frame data V and the real audio data AR in the data portion 102 in accordance with the order indicated by the video index data VI and the audio index data AI stored in the index portion 103.

Figure 3B:
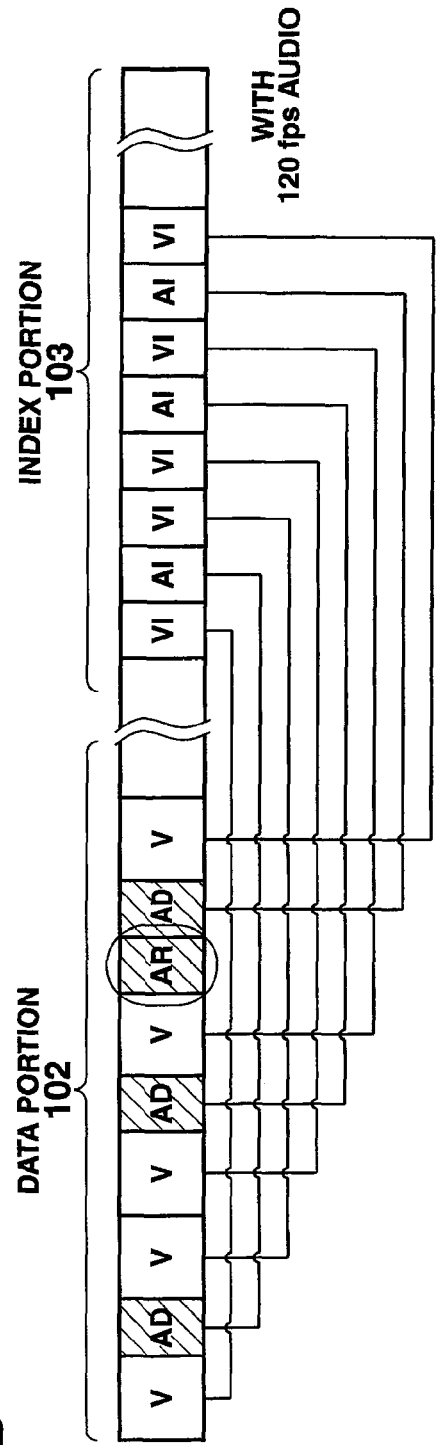

FIG. 3B (lower part of FIG. 3) illustrates the relation between image frame data and audio data in a case in which a moving image captured at a high frame rate of 120 fps is played back without skipping any frames constituting the moving image. The data portion 102 includes dummy audio data AD such as a silence or a predetermined sound, real audio data AR, and image frame data V constituting the moving image. The index portion 103 includes the video index data VI that specifies positions of the image frame data V and the audio index data AI that specifies positions of the real audio data AR or the dummy audio data AD in playback order.

The control unit 14 determines that the moving image is captured at a high frame rate based on the header portion 101 (See FIG. 2). Then the control unit 14 determines, in accordance with the playback mode, whether the audio index data AI corresponds to the real audio data AR or the dummy audio data AD.

In the present embodiment, in a case in which a moving image captured at a high frame rate is played back without skipping any frames thereof, the audio index data AI corresponds to the dummy audio data AD. Therefore, as shown in FIG. 3B, the audio index data AI specifies the positions of the dummy audio data AD. However, positions of any real audio data AR are not specified by the audio index data AI. Therefore, in the case in which a moving image captured at a high frame rate is played back without skipping any frames thereof, the dummy audio data AD is played back. On the other hand, the real audio data AR is not played back. If a moving image captured at a high frame rate is played back at a normal frame rate of 30 fps without skipping any frames thereof, a slow motion playback is performed. As the dummy audio data, silent audio data (no sound) may be used. Also, as the dummy audio data, data of a predetermined sound, e.g., a sound effect such as a bleep, a message such as "Playing back in slow motion", music, or the like may be employed. Alternatively, audio data such as information on the moving image, a plurality of sound effects, BGM (Back Ground Music), and the like may be prepared and stored as the dummy audio data in advance, so that any items of the dummy audio data may be selected or combined as appropriate and recorded. Thus, by using a sound effect, music, information on the moving image, a message, or the like as the dummy sound, even if a moving image is played back in slow motion for a long time, a user can pass time effectively, without being bored.

On the other hand, in the present embodiment, in a case in which a moving image captured at a high frame rate is played back at a normal frame rate by skipping some frames of the moving image, the audio index data AI corresponds to the real audio data AR of a real sound. The description hereinafter is directed to the case with reference to FIG. 4.

FIG. 4 is a diagram illustrating relations among image frame data, real audio data, and dummy audio data in the case of the slow motion playback mode in which a moving image file captured at a high frame rate by the digital camera 100 is played back without skipping any frames and in the case of the normal playback mode in which the moving image file is played back at a normal speed by skipping constituent frames thereof.

As shown in FIG. 4A, in the case of the slow motion playback mode, every position of the image frame data V in the data portion 102 is specified by the video index data VI in the index portion 103, and every position of the dummy audio data AD is specified by the audio index data AI in the index portion 103. On the other hand, positions of the real audio data AR are not specified by any item of the audio index data AI. Therefore, in the case in which a moving image captured at a high frame rate is played back without skipping any frames, the dummy audio data AD is played back. However, the real audio data AR is not played back.

FIG. 4B is a diagram illustrating the relations among the image frame data, the real audio data, and the dummy audio data, in the case of the normal playback mode in which a moving image captured at a high frame rate of 120 fps is played back at a normal frame rate of 30 fps by skipping three quarters of frames of the moving image.

The control unit 14 determines that the moving image is captured at 120 fps based on the header portion 101 (See FIG. 2). In a case in which a user, operating the playback mode change button 12, has selected the normal playback mode, the control unit 14 reduces the number of items of the video index data VI that specifies the positions of the image frame data V to be played back to one quarter thereof. Furthermore, the control unit 14 modifies the audio index data AI so that the audio index data AI specifies the positions of the real audio data AR but not the dummy audio data AD. With this, the moving image captured at a high frame rate of 120 fps is played back at a normal speed by skipping three quarters of constituent frames of the moving image. Also, the real audio data AR is played back. However, the dummy audio data AD is not played back.

Thus, in the present embodiment, a moving image captured at a high frame rate can be played back in slow motion without skipping any frames or at a normal speed by skipping three quarters of frames of the moving image, in synchronization with either of the dummy audio data and the real audio data that has been recorded.

The real audio data is continuously stored in the temporary audio memory 6 both in the case of capturing at a normal frame rate and in the case of capturing at a high frame rate. Alternatively, audio data of at least one of a real sound and a dummy sound may be collected in real time by way of the audio input/output unit 4. The audio data thus collected is sequentially erased after a predetermined time has elapsed to ensure that the temporary audio memory 6 constantly stores only a fixed amount of the latest audio data for the purpose of preventing the temporary audio memory 6 from overflowing with the real audio data accumulated while carrying out the processing of attaching the dummy audio data to the data of the moving image. Therefore, though the real audio data is continuously stored in the temporary audio memory 6 while the dummy audio data is being attached to the data of the moving image, the real audio data that has been stored is sequentially erased in order from oldest to latest after a predetermined time has elapsed. FIG. 4 illustrates only the case where the real audio data is continuously stored. With such processing, it becomes possible to maintain the continuity of audio data immediately after switching the capture frame rate.

In the following, processing content of the control unit 14 when the digital camera 100 of the present embodiment captures a moving image will be described with reference to the flowchart of FIG. 5. FIG. 5 is a flowchart showing flow of moving image capture processing carried out by the digital camera 100 of the present embodiment. The control unit 14 shown in FIG. 1 executes the processes described below by controlling each unit shown in FIG. 1. The processing of the present flowchart starts when a user operates the capture start/stop button 9 to start capturing a moving image.

In step S101, the control unit 14 starts processing of sequentially storing the data of the moving image outputted from the image capturing unit 2 into the temporary video memory 5 as well as of sequentially storing the audio data collected by the audio input/output unit 4 into the temporary audio memory 6. In step S102, the control unit 14 determines whether or not the capture frame rate currently set is 30 fps. The capture frame rate does not change while capturing as long as the frame rate switch button 10 is not operated. If the capture frame rate is 30 fps, control proceeds to step S103 (step S102: YES). If the capture frame rate has been changed from 30 fps due to any operation of the frame rate switch button 10 or the like, control proceeds to step S107 (step S102: NO).

In step S103, the control unit 14 controls the record/playback data creation unit 3 to sequentially encode the data of the moving image and the real audio data respectively stored in the temporary video memory 5 and the temporary audio memory 6 into data at a capture frame rate of 30 fps, attaches the audio data thus encoded to the data of the moving image thus encoded, and stores it in the memory card 7.

In step S104, the control unit 14 determines whether or not an instruction to terminate the capturing is detected. If the control unit 14 does not detect any instruction to terminate the capturing by way of an operation of the capture start/stop button 9, control proceeds to step S105 (step S104: NO). If the control unit 14 detects an instruction to terminate the capturing, control proceeds to step S111 (step S104: YES).

In step S105, the control unit 14 determines whether or not an instruction to change the capture frame rate is detected. If the control unit 14 determines that an instruction to change the capture frame rate by way of an operation of the frame rate switch button 10 has not been detected, control goes back to step S103 (step S105: NO), and the process of sequentially attaching the real audio data to the data of the moving image and storing it into the memory card 7 is repeated. On the other hand, if the control unit 14 determines that an instruction to change the capture frame rate has been detected, control proceeds to step S106 (step S105: YES). In step S106, the control unit 14 changes the capture frame rate to 120 fps, and control goes back to step S102.

If the determination of step S104 is YES, control proceeds to step S111, and the control unit 14 attaches header information including information such as a file name, a capture date, and a capture frame rate to the audio video data so far stored in the memory card 7 and turns it into a moving image file in the memory card 7. With this, the moving image capture processing ends.

On the other hand, if the determination of step S102 is NO in step S107, the control unit 14 controls the record/playback data creation unit 3 to sequentially encode the data of the moving image stored in the temporary video memory 5 into data at a capture frame rate of 120 fps, attaches the dummy audio data along with the real audio data to the data of the moving image thus encoded, and sequentially stores it in the memory card 7. The dummy audio data may be attached to the data of the moving image at timing immediately before or after the real audio data being attached to the data of the moving image.

In the following step S108, the control unit 14 determines whether or not an instruction to terminate the capturing has been detected. If the control unit 14 does not detect any instruction to terminate the capturing by way of an operation of the capture start/stop button 9, control proceeds to step S109 (step S108: NO). On the other hand, if the control unit 14 detects an instruction to terminate the capturing, control proceeds to step S111 (step S108: YES). In this case, since the dummy audio data along with the real audio data is attached to the data of the moving image and audio video data thus created is sequentially stored in the memory card 7 in the precedent step S107, in step S111, the control unit 14 attaches header information including information such as file name, capture date, and capture frame rate to the audio video data so far stored in the memory card 7 and turns it into a moving image file in the memory card 7. With this, the moving image capture processing ends.

In step S109, the control unit 14 determines whether or not an instruction to change the capture frame rate has been detected. If any instruction to change the capture frame rate by way of an operation of the frame rate switch button 10 has not been detected, control goes back to step S107 (step S109: NO), and the process of attaching the real audio data and the dummy audio data to the data of the moving image and sequentially storing it in the memory card 7 is repeated. On the other hand, if an instruction to change the capture frame rate is detected, control proceeds to step S110 (step S109: YES). In step S110, the control unit 14 changes the capture frame rate to the designated frame rate, i.e., 30 fps, and control goes back to step S102.

Figure 6:
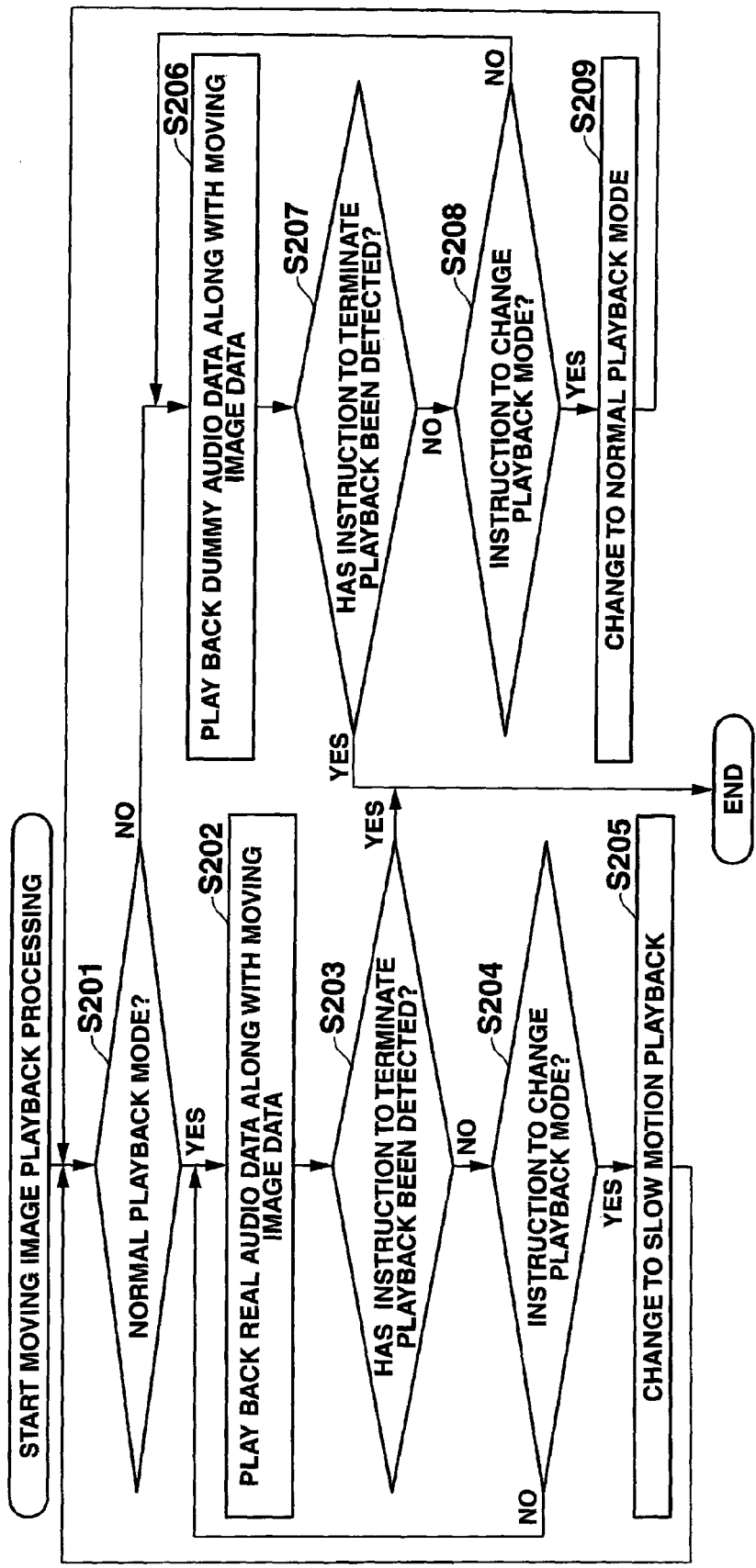
FIG. 6 is a flowchart showing flow of moving image playback processing carried out by the digital camera shown in FIG. 1.

In the following, processing content of the control unit 14 when playing back the moving image file thus created will be described with reference to the flowchart of FIG. 6. FIG. 6 is a flowchart showing flow of moving image playback processing carried out by the digital camera 100 of the present embodiment. The control unit 14 shown in FIG. 1 executes the processes described below by controlling each unit shown in FIG. 1. It is assumed that the memory card 7 stores the moving image file according to the present embodiment, which has been created by the moving image capture processing already described with reference to the flowchart of FIG. 5. The processing of the present flowchart starts when a user operates the playback start/stop button 11 to start playing back the moving image file stored in the memory card 7. Here, for ease of description, a description will be given of the playback of only a portion captured at a high frame rate of 120 fps, from a moving image file created in the moving image capture processing described with reference to the flowchart of FIG. 5.

In step S201, the control unit 14 determines whether or not the playback mode currently set is the normal playback mode. The playback mode is not changed as long as the playback mode change button 12 is not operated while playing back. If the playback mode is the normal playback mode, control proceeds to step S202 (step S201: YES). If the playback mode has been changed due to any operation of the playback mode change button 12 or the like, control proceeds to step S206 (step S201: NO).

In step S202, the control unit 14 controls the record/playback data creation unit 3 to play back, at a normal frame rate of 30 fps, the data of the moving image captured at 120 fps and stored in the memory card 7 by skipping some frames thereof, along with the real audio data. More specifically, as shown in FIG. 4B, the control unit 14 controls the record/playback data creation unit 3 to edit the video index data VI of the moving image file and reduce the number of items of the video index data VI that specify the positions of the image frame data V to one quarter thereof. Furthermore, the control unit 14 controls the record/playback data creation unit 3 to modify the audio index data AI to specify the positions of the real audio data AR. Thus, the control unit 14 plays back, at a frame rate of 30 fps, the moving image captured at 120 fps by skipping some frames thereof. This means that the control unit 14 plays back the image frame data V and the real audio data AR in the normal playback mode in accordance with the order indicated by the video index data VI and the audio index data AI, and outputs them via the liquid crystal display device 8 and the audio input/output unit 4 as shown in FIG. 4B.

In step S203, the control unit 14 determines whether or not an instruction to terminate the playback has been detected. If the control unit 14 does not detect any instruction to terminate the playback by way of operation of the playback start/stop button 11, control proceeds to step S204 (step S203: NO), and if the control unit 14 detects an instruction to terminate the playback, the moving image playback processing ends (step S203: YES).

In step S204, the control unit 14 determines whether or not an instruction to change the playback mode has been detected. If it is determined that an instruction to change the playback mode by way of the operation of the playback mode change button 12 has not been detected, control goes back to step S202 (step S204: NO), and the process of playing back the moving image file in the normal playback mode is repeated. On the other hand, if it is determined that an instruction to change the playback mode has been detected, control proceeds to step S205 (step S204: YES). In step S205, the control unit 14 changes the playback mode to the slow motion playback mode, and control goes back to step S201.

On the other hand, if the determination of step S201 is NO, in step S206, the control unit 14 controls the record/playback data creation unit 3 to play back, at 30 fps in slow motion, the data of the moving image captured at 120 fps and stored in the memory card 7 without skipping any frames thereof, along with the dummy audio data. More specifically, as shown in FIG. 3B or FIG. 4A, the control unit 14 controls the record/playback data creation unit 3 to modify the audio index data AI to specify the positions of the dummy audio data AD. Thus, the control unit 14 plays back the image frame data V and the dummy audio data AD in accordance with the order indicated by the video index data VI and the audio index data AI, and outputs them via the liquid crystal display device 8 and the audio input/output unit 4. Accordingly, the control unit 14 plays back, at a frame rate of 30 fps, the moving image captured at 120 fps without skipping any frames. This means that the control unit 14 plays back the image frame data V and the dummy audio data AD in accordance with the order indicated by the video index data VI and the audio index data AI in slow motion and outputs them via the liquid crystal display device 8 and the audio input/output unit 4, as shown in FIG. 3B or FIG. 4A.

In the following step S207, the control unit 14 determines whether or not an instruction to terminate the playback has been detected. If the control unit 14 does not detect any instruction to terminate the playback by way of the operation of the playback start/stop button 11, control proceeds to step S208 (step S207: NO). If, on the other hand, the control unit 14 detects an instruction to terminate the playback, the moving image playback processing ends (step S207: YES).

In step S208, the control unit 14 determines whether or not an instruction to change the playback mode has been detected. If an instruction to change the playback mode by way of the operation of the playback mode change button 12 has not been detected, control goes back to step S206 (step S208: NO), and the process of playing back the moving image file in slow motion is repeated. On the other hand, if an instruction to change the playback mode is detected, control proceeds to step S209 (step S208: YES). In step S209, the control unit 14 changes the playback mode to the normal playback mode, and control goes back to step S201.

As described above, with the digital camera 100 provided with functions as a moving image processing apparatus according to the present embodiment, the control unit 14 attaches two kinds of audio data consisting of real audio data and dummy audio data, which are stored in a temporary audio memory 6, to data of a moving image stored in a temporary video memory 5, in accordance with the capture frame rate specified by the frame rate switch button 10, and creates a moving image file having a header portion 101 which contains the capture frame rate of the data of the moving image, a data portion 102 which contains the data of the moving image, the real audio data, and the dummy audio data, and an index portion 103 which contains index data indicating the data of the moving image, and either of the real audio data and the dummy audio data.

The control unit 14 attaches playback information to the header portion 101. The playback information. The playback information indicates playback modes corresponding to the two kinds of audio data consisting of the real audio data and the dummy audio data using audio index data AI of the index portion 103. The playback mode indicates a relation of the playback frame rate and the capture frame rate. The normal playback mode is a playback mode in which data of the moving image is played back at a playback frame rate equal to the capture frame rate, or a playback mode in which some frames of the moving image are skipped so as to reduce the frame rate equal to a playback frame rate, and the moving image thus skipped is played back at the playback frame rate. The slow motion playback mode is a playback mode in which a moving image is played back at a playback frame rate lower than the capture frame rate.

Although a description has been given of the case in which two kinds of audio data consisting of the real audio data and the dummy audio data are attached to the data of a moving image, the present invention is not limited thereto. More than two kinds of audio data can be attached to the data of the moving image. Furthermore, the audio data played back along with the data of the moving image can be diverse in accordance with the playback mode. When more than two kinds of audio data are attached to the data of the moving image, the audio index data AI may be used to specify each kind of the audio data to be played back as appropriate for each playback mode.

For example, in a case in which a moving image is captured at a high frame rate, more than one kind of dummy audio data such as a sound effect, music, or information on the moving image, may be attached as well as the real audio data, and the kind of audio data to be played back may be specified for each playback mode as appropriate by using the audio index data AI in a manner, for example, such that the information on the moving image is played back in the case of extreme slow motion, music is played back in the case of normal slow motion, and a sound effect is played back in the case of slight slow motion. This can be easily realized under the control of the control unit 14 by skipping some frames of the video index data VI and modifying the audio index data AI that indicates the positions of the audio data as appropriate in accordance with the playback mode.

As described above, with the digital camera 100 provided with functions as a moving image processing apparatus according to the present embodiment, the control unit 14 functions as an audio data attaching unit that attaches more than one kind of audio data to the data of a moving image and as a playback information attaching unit that attaches playback information indicating the playback mode corresponding to each of the more than one kind of audio data. The image capturing unit 2 that capture images of a subject and generates data of a moving image is capable of changing the capture frame rate while capturing a moving image, and the control unit 14 that functions as the audio data attaching unit can attach more than one kind of audio data to the moving image when the moving image is captured at a predetermined frame rate.

Thus, according to the digital camera 100 of the present embodiment, since an appropriate kind of audio data can be selectively played back from among more than one kind of audio data attached to a moving image file, even in a case in which a moving image captured at a high speed is played back at a normal frame rate by skipping some frames thereof, it becomes possible to play back an appropriate sound with a simple configuration.

Furthermore, the digital camera 100 of the present embodiment further includes an audio input/output unit 4 that functions as a sound collecting unit that collects sound while the image capturing unit 2 captures images, and the control unit 14 that functions as the audio data attaching unit can attach audio data of a real sound collected by the audio input/output unit 4 and audio data of a dummy sound substituting the real sound as more than one kind of audio data when images are captured at a predetermined frame rate, especially at a high frame rate. Furthermore, the control unit 14 can attach playback information that indicates a playback mode corresponding to each kind of audio data, i.e., the normal playback mode corresponding to the real audio data and the slow motion playback mode corresponding to the dummy audio data.

The digital camera 100 of the present embodiment is also provided with functions as a moving image playback apparatus that plays back a moving image file including data of a moving image, more than one kind of audio data, and a header portion 101 containing playback information that indicates a playback mode corresponding to each of the more than one kind of audio data. The digital camera 100 provided with functions as in such a moving image playback apparatus includes a playback mode change button 12 serving as a determining unit that determines playback modes including a normal playback mode and a slow motion playback mode, a control unit 14 serving as an audio data specifying unit that specifies the kind of audio data corresponding to the playback mode determined by the playback mode change button 12 with reference to the header portion 101, and a control unit 14 serving as a moving image playback unit that plays back the data of the moving image included in the moving image file along with the kind of audio data specified by the audio data specifying unit.

The digital camera 100 of the present embodiment thus constructed has at least following effects:

1. Since audio data of a real sound is attached to data of a moving image captured at a normal frame rate (30 fps) equal to the playback frame rate (30 fps) and audio data of a dummy sound along with audio data of the real sound is attached to data of a moving image captured at a frame rate (120 fps) higher than the playback frame rate, the real sound can be played back if a moving image captured at the normal frame rate is played back at the normal frame rate or if a moving image captured at the high frame rate is played back in such a manner that some frames of the moving image are skipped so as to reduce the frame rate thereof to a playback frame rate, and the moving image thus skipped is played back at the playback frame rate, and the dummy sound can be played back if a moving image captured at the high frame rate is played back in slow motion without skipping any frames thereof. Therefore, it is possible to avoid hardly audible sound from being played back, since either one of the real sound and the dummy sound is played back regardless of whether a moving image captured at the normal frame rate is played back at the normal frame rate, a moving image captured at the high frame rate is played back in such a manner that some frames of the moving image are skipped so as to reduce the frame rate thereof to a playback frame rate, and the moving image thus skipped is played back at the playback frame rate, or a moving image captured at the high frame rate is played back in slow motion without skipping any frames thereof.

2. Since sound encoding processing is not required to be stopped or restarted each time when the capture frame rate is changed while a moving image is captured, the sound encoding processing can be carried out constantly in the same manner as in the normal case of capturing a moving image. Accordingly, it is possible to reduce the processing load of the CPU.

3. Since audio data of a real sound is attached to data of a moving image not only when the moving image is captured at a normal frame rate but also at a high frame rate, it becomes possible to play back the moving image more vividly in comparison with the case in which no sound is heard depending on the relation between the capture frame rate and the playback frame rate.

4. Furthermore, since, when a moving image is captured at a high frame rate, a dummy sound is attached to the data of a moving image so as to output a sound effect such as a bleep, a message such as "Playing back in slow motion", information on the moving image, music, or the like, it becomes possible to provide more stimulation or helpful information along with the moving image to a user, who only could only watch the moving image in slow motion with no sound for a long time, when playback in slow motion is performed.

5. Also, a real sound is continuously recorded while the capture frame rate is changed from 30 fps to 120 fps or from 120 fps to 30 fps. Therefore, it becomes possible to maintain continuity of audio data even if portions immediately before and after the capture frame rate of the moving image is changed are played back.

One embodiment of the present invention has been described, but the present invention is not limited to the embodiment described above. Modifications and improvements thereto within the scope in which an object of the present invention can re realized, are included in the invention.

In the present embodiment, a description has been given of a capture mode of a moving image in which the capture frame rate can be changed between 30 fps and 120 fps, but the present invention is not limited thereto. The present invention may be applied to a capture mode in which the capture frame rate can be changed to any higher frame rate. Furthermore, any frame rate other than 30 fps and 120 fps may be employed as the capture frame rate and/or the playback frame rate. Also, even if the frame rate is not varied while a moving image is captured, audio data of a real sound and a dummy sound may be attached to data of a moving image when the moving image is captured at a high frame rate, as is the case in the present embodiment.

Furthermore, in the present embodiment, a description has been given in which, in step S101 of the moving image capture processing, data of the moving image outputted from the image capturing unit 2 is sequentially stored in the temporary video memory 5, audio data collected by the audio input/output unit 4 is sequentially stored in the temporary audio memory 6, and then the audio data is attached to the data of the moving image. However, the present invention is not limited thereto.

For example, data of a moving image other than the one captured by the image capturing unit 2 may be similarly processed, and audio data of sound other than that collected by the audio input/output unit 4 may be similarly processed. More specifically, such data of a moving image and/or audio data to be processed may be acquired via a wireless communication network by controlling a communication unit (not shown) or via a removable storage medium such as the memory card 7.

Furthermore, in step S202 of moving image playback processing, the control unit 14 controls the record/playback data creation unit 3 to play back a moving image file stored in the memory card 7, i.e., the control unit 14 plays back a real sound along with a moving image. More specifically, it has been described that the control unit 14 controls the record/playback data creation unit 3 to edit the index portion 103 and thereby plays back the moving image along with the real sound, while skipping three quarters of frames of the moving image to be played back, as shown in FIG. 4B. However, the present invention is not limited thereto. For example, the control unit 14 may control the record/playback data creation unit 3 to edit the data portion 102, to reduce the image frame data V to be played back to one quarter thereof, and to delete the dummy audio data AD, and thereby plays back the image frame data V thus reduced to one quarter along with the real audio data AR.

The present invention is not limited to a digital video camera or a digital camera and can be applied to any electronic device provided with functions of capturing and playing back moving images. More specifically, the present invention can be applied to a digital still camera, a cell phone with a camera, a video camera, a portable game device, and the like. Also, a moving image capture program according to the present invention can be applied to any kind of apparatus, for example, an apparatus only capable of playing back a captured moving image, a general-purpose personal computer provided with a general configuration, and the like.

A portion or all functions of the control unit 14 described above may be implemented by another control unit operating in parallel with the control unit 14, in accordance with a moving image capture program according to the present invention.

In a case in which the series of processing is to be executed by software, the program configuring the software is installed from a network or a storage medium in a computer or the like.

The computer may be a computer incorporated in dedicated hardware. Alternatively, the computer may be a computer capable of executing various functions by installing various programs, i.e., a general-purpose personal computer, for example.

The storage medium containing the program can be configured not only by removable media such as a memory card distributed separately from the device main body for supplying the program to a user, but also by a storage medium or the like supplied to the user in a state incorporated in the device main body in advance. The removable media is composed of a magnetic disk (including a flexible disk), an optical disk, a magnetic optical disk, or the like, for example. The optical disk is constituted by a CD-ROM (Compact Disk-Read Only Memory), a DVD (Digital Versatile Disk), or the like. The magnetic optical disk is constituted by an MD (Mini-Disk) or the like. The storage medium supplied to the user in the state incorporated in the device main body in advance includes a ROM (not shown) included in the control unit 14 in FIG. 1 storing the program, a hard disk (not shown), and the like, for example.

It should be noted that, in the present description, the step describing the program stored in the storage medium includes not only the processing executed in a time series following this order, but also includes processing executed in parallel or individually, which is not necessarily executed in a time series.

What is claimed is:

1. A moving image processing apparatus, comprising:
   an image capturing unit that acquires data of a moving image including a plurality of continuous image frames, by image capturing;
   an audio data attaching unit that attaches two kinds of audio data consisting of a real sound and a dummy sound to the data of the moving image acquired by the image capturing unit; and
   a playback information attaching unit that attaches playback information to the data of the moving image to which the two kinds of audio data is attached by the audio data attaching unit, the playback information indicating a playback mode corresponding to each of the two kinds of audio data when the data of the moving image is played back,
   wherein the playback mode includes a first playback mode of playing back the data of the moving image in real speed and playing back only the real sound of the two kinds of audio data, and a second playback mode of playing back the data of the moving image in slow motion and playing back only the dummy sound of the two kinds of audio data; and
   wherein the real sound is a sound that is recorded when the moving image data is captured, and the dummy sound is a sound that is different from the real sound.

2. The moving image processing apparatus as set forth in claim 1, wherein the audio data attaching unit attaches only audio data of the real sound to data of a moving image captured at a predetermined capture frame rate and attaches the two kinds of audio data to data of a moving image captured at a frame rate higher than the predetermined capture frame rate.

3. The moving image processing apparatus as set forth in claim 1, wherein the data of the moving image is played back at a frame rate equal to the predetermined capture frame rate in the first playback mode and the second playback mode, and an image frame in the moving image data is not skipped to be played back in the first playback mode and an image frame in the moving image data is skipped periodically to be played back in the second playback mode.

4. A moving image playback apparatus that plays back a moving image file including data of a moving image including a plurality of continuous image frames acquired by image capturing, two kinds of audio data consisting of a real sound and a dummy sound, and playback information that indicates a playback mode corresponding to each of the two kinds of audio data, the moving image playback apparatus comprising:
   a determining unit that determines the playback mode that indicates either of playing back the moving image data in real speed or playing back the moving image data in slow motion;
   an audio data specifying unit that specifies to play back only the real sound among the two kinds of audio data when the determining unit determines to play back the moving image data in real speed, and specifies to play back only the dummy sound among the two kinds of audio data when the determining unit determines to play back the moving image data in slow motion; and
   a moving image playback unit that plays back the data of the moving image along with the audio data specified by the audio data specifying unit, according to the one of the playback modes determined by the determining unit;
   wherein the real sound is a sound that is recorded when the moving image data is captured, and the dummy sound is a sound that is different from the real sound.

5. The moving image playback apparatus defined in claim 4, wherein:
   the playback mode includes a first playback mode of playing back the data of the moving image by skipping some of the image frames of the data of the moving image and a second playback mode of playing back the data of the moving image without skipping any of the image frames of the data of the moving image.

6. The moving image playback apparatus defined in claim 4, wherein:
   the data of the moving image is data of a moving image in which a capture frame rate of the moving image is changed while being captured, the two kinds of audio data being attached to the data of the moving image of a period captured at a frame rate higher than a predetermined capture frame rate, and
   the moving image playback unit plays back the data of the moving image at a frame rate equal to the predetermined capture frame rate.

7. A moving image processing method, comprising:
   acquiring data of a moving image including a plurality of continuous image frames, by image capturing;
   attaching two kinds of audio data consisting of a real sound and a dummy sound to the acquired data of the moving image; and
   attaching playback information to the data of the moving image to which the two kinds of audio data is attached, the playback information indicating a playback mode corresponding to each of the two kinds of audio data when the data of the moving image is played back,
   wherein the playback mode includes a first playback mode of playing back the data of the moving image in real speed and playing back only the real sound of the two kinds of audio data, and a second playback mode of playing back the data of the moving image in slow motion and playing back only the dummy sound of the two kinds of audio data; and
   wherein the real sound is a sound that is recorded when the moving image data is captured, and the dummy sound is a sound that is different from the real sound.

8. A non-transitory computer-readable storage medium having a program stored thereon which is executable by a computer included in a moving image processing apparatus, the moving image processing apparatus including an image capturing unit that acquires data of a moving image including a plurality of continuous image frames, by image capturing, and the program being executable to control the computer to function as units comprising:

an audio data attaching unit that attaches two kinds of audio data consisting of a real sound and a dummy sound to the data of the moving image acquired by the image capturing unit; and a playback information attaching unit that attaches playback information to the data of the moving image to which the two kinds of audio data is attached by the audio data attaching unit, the playback information indicating a playback mode corresponding to each of the two kinds of audio data when the data of the moving image is played back, wherein the playback mode includes a first playback mode of playing back the data of the moving image in real speed and playing back only the real sound of the two kinds of audio data and a second playback mode of playing back the data of the moving image in slow motion and playing back only the dummy sound of the two kinds of audio data; and wherein the real sound is a sound that is recorded when the moving image data is captured, and the dummy sound is a sound that is different from the real sound.

9. A moving image playback method of a moving image playback apparatus that plays back a moving image file including data of a moving image including a plurality of continuous image frames acquired by image capturing, two kinds of audio data consisting of a real sound and a dummy sound, and playback information that indicates a playback mode corresponding to each of the two kinds of audio data, the moving image playback method comprising:

determining the playback mode which indicates either of playing back the moving image data in real speed or playing back the moving image data in slow motion;

specifying to play back only the real sound among the two kinds of audio data upon determining to play back the moving image data in real speed in the determining, and specifying to play back only the dummy sound among the two kinds of audio data upon determining to play back the moving image data in slow motion in the determining; and playing back the data of the moving image along with the specified on of audio data according to the one of the determined playback modes;

wherein the real sound is a sound that is recorded when the moving image data is captured, and the dummy sound is a sound that is different from the real sound.

10. A non-transitory computer-readable storage medium having a program stored thereon which is executable by a computer included in a moving image playback apparatus that plays back a moving image file including data of a moving image including a plurality of continuous image frames acquired by image capturing, two kinds of audio data consisting of a real sound and a dummy sound, and playback information that indicates a playback mode corresponding to each of the two kinds of audio data, the program being executable to control the computer to function as units comprising:

a determining unit that determines the playback mode that indicates either of playing back the moving image data in real speed or playing back the moving image data in slow motion;

an audio data specifying unit that specifies to play back only the real sound among the two kinds of audio data when the determining unit determines to play back the moving image data in real speed, and specifies to play back only the dummy sound among the two kinds of audio data when the determining unit determines to play back the moving image data in slow motion; and a moving image playback unit that plays back the data of the moving image included in the moving image file along with the audio data specified by the audio data specifying unit, according to the one of the playback modes determined by the determining unit;

wherein the real sound is a sound that is recorded when the moving image data is captured, and the dummy sound is a sound that is different from the real sound.

\* \* \* \* \*

UNITED STATES PATENT AND TRADEMARK OFFICE
CERTIFICATE OF CORRECTION

| | |
|---|---|
| PATENT NO. | : 9,014,538 B2 |
| APPLICATION NO. | : 13/224534 |
| DATED | : April 21, 2015 |
| INVENTOR(S) | : Daisuke Otani et al. |

It is certified that error appears in the above-identified patent and that said Letters Patent is hereby corrected as shown below:

Claims

Column 18, Line 7, claim 9 after "specified" delete "on of".

Signed and Sealed this
Sixth Day of October, 2015

Michelle K. Lee
*Director of the United States Patent and Trademark Office*